(12) United States Patent
Dubertrand

(10) Patent No.: US 9,335,221 B2
(45) Date of Patent: May 10, 2016

(54) DEVICE FOR PROCESSING AN OPTICAL PULSE TO MEASURE THE CONTRAST OF THIS PULSE, AND CONTRAST MEASUREMENT SYSTEM USING THE DEVICE

(71) Applicant: Commissariat à l'ènergie atomique et aux énergies alternatives, Paris (FR)

(72) Inventor: Jérôme Dubertrand, Mios (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/435,903

(22) PCT Filed: Oct. 22, 2013

(86) PCT No.: PCT/EP2013/072014
§ 371 (c)(1),
(2) Date: Apr. 15, 2015

(87) PCT Pub. No.: WO2014/064068
PCT Pub. Date: May 1, 2014

(65) Prior Publication Data
US 2015/0292952 A1    Oct. 15, 2015

(30) Foreign Application Priority Data

Oct. 24, 2012  (FR) ...................... 12 60137

(51) Int. Cl.
*G01J 1/42*     (2006.01)
*G01J 11/00*    (2006.01)

(52) U.S. Cl.
CPC ...................... *G01J 11/00* (2013.01)

(58) Field of Classification Search
CPC ............ G01J 11/00; G01R 1/00; G01N 21/39
USPC .................... 356/213–235; 398/102, 53, 161; 250/338.1–338.5
See application file for complete search history.

(56) References Cited

U.S. PATENT DOCUMENTS 6,320,692 B1   11/2001   Notargiacomo
6,611,336 B1 *  8/2003   Walmsley ............... G01B 9/02
                                              355/450

(Continued)

FOREIGN PATENT DOCUMENTS

FR       2 899 328 A1   10/2007

OTHER PUBLICATIONS

Dongfang Zhang et al., "Fiber-array-based detection scheme for single-shot pulse contrast characterization" Optics Letters, vol. 33, No. 17, Sep. 1, 2008.

(Continued)

*Primary Examiner* — Hoa Pham
(74) *Attorney, Agent, or Firm* — Pearne & Gordon LLP

(57) ABSTRACT

Device for processing an optical pulse to measure the temporal contrast of this pulse, and system for measuring the contrast using the device. This device comprises: a device (2) receiving the pulse and providing the peak and pedestal of the pulse; a device (4) to create a temporal shift between the peak and the pedestal; a device (6) to attenuate the peak such that its level is of the same order of magnitude as the level of the pedestal; and a device (8) to multiplex the peak and the pedestal. The contrast is then equal to the ratio of the peak level to the pedestal level, these levels being corrected by the attenuations applied to them in the processing device.

12 Claims, 2 Drawing Sheets

(56) References Cited

U.S. PATENT DOCUMENTS

| | | | | |
|---|---|---|---|---|
| 6,633,386 B2* | 10/2003 | Walmsley | ............... | G01J 11/00 356/450 |
| 8,095,017 B2 | 1/2012 | Patissou | | |
| 2012/0228501 A1* | 9/2012 | Qian | ................. | G01J 11/00 250/338.1 |
| 2014/0299771 A1* | 10/2014 | Rahman | ................. | G01J 3/02 250/338.3 |

OTHER PUBLICATIONS

Search Report issued in French Patent Application No. FR 12 60137 dated May 13, 2013.

International Search Report issued in Application No. PCT/EP2013/072014 dated Dec. 9, 2013.

Written Opinion issued in Application No. PCT/EP2013/072014 dated Dec. 9, 2013.

* cited by examiner ized is only about 7 bits, in other words about 10².

DEVICE FOR PROCESSING AN OPTICAL PULSE TO MEASURE THE CONTRAST OF THIS PULSE, AND CONTRAST MEASUREMENT SYSTEM USING THE DEVICE

TECHNICAL FIELD

This invention relates to a device for processing an optical pulse to measure the temporal contrast of this pulse, together with a system with wide dynamic range for measuring the contrast, using the device.

The invention is particularly applicable to the measurement of temporal contrasts with a wide dynamic range of more than $10^5$, on single-shot pulses.

The invention can be used particularly to make measurements of temporal contrasts on pulses output by high power lasers such as the Megajoule laser.

STATE OF PRIOR ART

The usual method used to measure the temporal contrast of an optical pulse is a photodetector associated with an oscilloscope. Such a technique does have a disadvantage in that the dynamic range possible is not very high. For example, the effective dynamic range of an oscilloscope with a passband equal to 6 GHz is only about 7 bits, in other words about $10^2$.

A system is also known for making temporal shape measurements with a wide dynamic range, starting from single-shot pulses. The following documents provide information about this system:

[1] FR 2 899 328, Dispositif entièrement optique de découpage de la dynamique d'un signal optique et système de mesure du signal, utilisant ce dispositif,

[2] U.S. Pat. No. 8,095,017, Fully optical device for breaking down the dynamic range of an optical signal and system for measuring the signal using the device, corresponding to document [1].

The principle of this system consists of making replicas of the studied optical pulse by means of optical couplers. The level of each replica is adjusted to characterise a portion of the pulse. The replicas are shifted relative to each other in time and are then recombined and analysed. This system is capable of measuring contrasts of $10^3$ when used in single-shot operating mode.

This known system can be used to measure the temporal shape of a continuous pulse with a wide dynamic range; but it cannot be used to measure contrasts of more than $10^3$. The signals that are sent to the photodetector used in the system are very close to saturating this photodetector.

Therefore, the system takes a certain time before returning to its nominal state. And the signals used to observe the low part of the dynamic range of the temporal shape according to the invention strongly saturate the rating of the oscilloscope associated with the photodetector.

The maximum dynamic range can only be obtained with this known system if the peak power of the pulse to be characterised is of the order of 400 mW; the photodetector will be saturated if the peak power of the input signal is higher than this value, and the contrast will be degraded if it is lower than this value.

PRESENTATION OF THE INVENTION

The purpose of this invention is to overcome the disadvantages described above.

The invention also includes the creation of replicas of a pulse; but the pulse peak is clipped by a pass in a modulation device.

The measurement of a wide dynamic range contrast is made possible by the combination of different optical components. The combination of these components with electronic means and a specific implementation makes the invention easy to use.

Specifically, the purpose of this invention is a device for processing an optical pulse to measure the temporal contrast of this pulse, the optical pulse having a pedestal and a principal peak also called the main pulse, on the pedestal, the device being characterised in that it comprises:

an optical separation device comprising an input channel to receive the optical pulse, and first and second output channels to provide the main peak and at least part of the pedestal that is used for measuring the temporal contrast, respectively, a temporal shift device to create a temporal shift between the main peak and the part of the pedestal, relative to each other, an attenuation device to attenuate the main peak such that the corresponding levels of the main peak and the part of the pedestal are of the same order of magnitude, and an optical multiplexing device to multiplex the main peak thus attenuated and the part of the pedestal temporally shifted relative to the main peak, the contrast then being equal to the ratio of the measurement of the level of the main peak and the measurement of the level of the part of the pedestal, the levels of the main peak and the part of the pedestal being corrected by the attenuations applied to them in the processing device.

According to a first particular embodiment of the device according to the invention, the optical separation device comprises:

an optical division device with one input forming the input channel that receives the optical pulse, and first and second outputs to provide the first and second replicas respectively of the optical pulse, the first output being connected to the first output channel, and an optical amplitude modulation device with an input connected to the second output, and an output connected to the second output channel, designed to eliminate the main peak from the second replica and to allow only the part of the pedestal to pass when a control signal provided for this purpose is applied to it.

The device according to the invention may then also comprise a trigger device to trigger the modulation device by the main peak of the optical pulse.

Preferably, this trigger device comprises:

an optical coupler to sample a part of the first replica, and an opto-electrical conversion device that receives the part thus sampled and outputs an electrical signal representative of it, and the modulation device is controlled by the electrical signal.

The duration of the control signal applied to the optical amplitude modulation device is preferably sufficient so that this optical amplitude modulation device also eliminates this part of the optical pulse in which the first replica of the optical pulse will be recombined with the output signal from the optical amplitude modulation device.

Preferably, the control signal of the optical amplitude modulation device is proportional to the optical pulse.

According to a second particular embodiment of the device according to the invention, the optical separation device comprises an optical amplitude modulator with an input that forms the input channel to receive the optical pulse, and first and second outputs that are complementary to each other and form the first and second output channels respectively to provide the main peak and the part of the pedestal respectively when a control signal provided for this purpose is applied to the modulator.

According to one preferred embodiment of the device according to the invention, the temporal shift device comprises an optical fibre.

Preferably, the multiplexing device comprises an optical coupler.

According to one preferred embodiment of the invention, the attenuation device is tuneable.

This invention also relates to a system for measuring the temporal contrast of an optical pulse comprising:
the optical pulse processing device according to the invention,
a photodetection device to detect the main peak and the part of the pedestal that were multiplexed and to output an electrical signal that is representative of the corresponding levels of the main peak and the part of the pedestal, and
an electronic processing device to process the electrical signal in order to determine the value of the contrast.

Preferably, the electronic processing device comprises an oscilloscope or a digitiser.

BRIEF DESCRIPTION OF THE DRAWINGS

This invention will be better understood after reading the description of example embodiments given below purely for information and that is in no way limitative, with reference to the appended drawings in which.

DETAILED PRESENTATION OF PARTICULAR EMBODIMENTS

Figure 1:
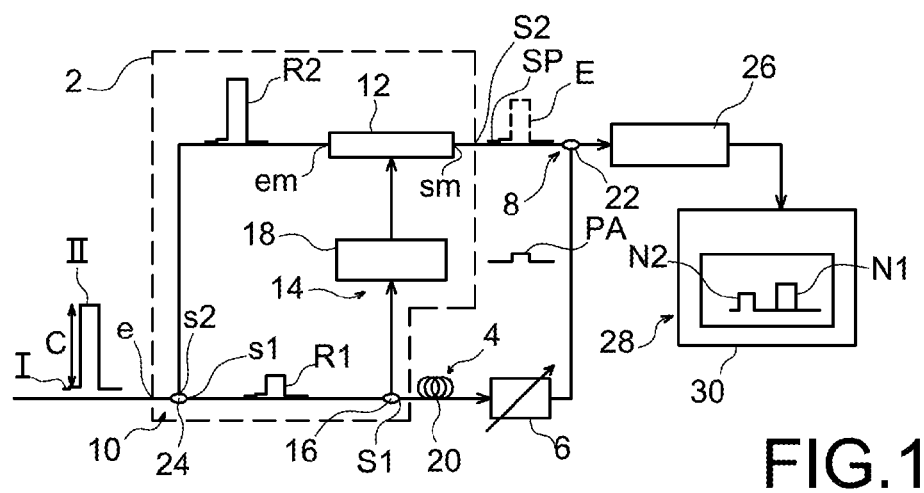
FIG. 1 is a diagrammatic view of a first particular embodiment of the device according to the invention, FIG. 2 diagrammatically illustrates the possibility of measuring the contrast of a pulse with a non-negligible continuous background making use of the device shown in FIG. 1, FIG. 3 diagrammatically illustrates an example of a laser pulse for which the temporal contrast is to be measured, FIG. 4 diagrammatically illustrates the signal obtained at the output from the modulator included in the device in FIG. 1, if the main peak of this laser pulse is clipped.

FIG. 1 is a diagrammatic view of a particular embodiment of the device according to the invention. This device is completely fibred and it is designed to process a laser pulse to measure the temporal contrast in single-shot or recurrent conditions.

FIG. 1 also shows a system according to the invention capable of measuring the temporal contrast C of the laser pulse. This pulse comprises a pedestal I with an intensity that is not equal to zero, and a main peak II on the pedestal I.

In particular, the system is capable of measuring temporal contrasts with a peak-plateau ratio of more than $10^5$ in recurrent or single-shot conditions, on nanosecond laser pulses.

The device and the system shown in FIG. 1 may be adapted to a wide spectral range and various types of pulses, by adapting their components to the pulses.

The principle of the device consists of dividing the pulse into two signals that propagate on two measurement channels and that are identical but are more or less attenuated depending on the measurement channel considered. One of the channels is used to make the measurement of the pedestal I of the pulse and the other channel to measure the peak II.

The pedestal is measured without being hindered by the peak, by eliminating this peak by means of an optical amplitude modulation device that only allows the pedestal (or more precisely, at least part of this pedestal, the part that is used to measure the temporal contrast) to pass through. Finally, the signals are recombined and then analysed.

This device and the system of which it forms part can be used to measure contrasts of up to more than $10^5$. This limit ($10^5$) is imposed by the extinguishing rate of a simple modulation device that eliminates the peak on one of the measurement channels. But this limit could be extended using a composite modulation device, for example a double modulation device.

However, the power of the studied optical pulse and the sensitivity of the photodetector that will be used after the pulse processing device then have to be increased.

More precisely, the laser pulse processing device that is diagrammatically shown in FIG. 1, comprises an optical separation device 2 comprising an input channel e to receive the optical pulse, and first and second output channels S1, S2 to provide the main peak and at least a part of the pedestal used for measuring the temporal contrast, respectively.

The processing device also comprises a temporal shift device 4 to shift the main peak and the part of the pedestal relative to each other in time.

The processing device also comprises an attenuation device 6 to attenuate the main peak so that the corresponding levels of the main peak and the part of the pedestal are of the same order of magnitude, and an optical multiplexing device 8 to multiplex the main peak thus attenuated and the part of the pedestal thus temporally shifted relative to the main peak. We will discuss the characteristics of this device 8 again later.

The signal output from the attenuator corresponding to the attenuated peak is marked with reference PA in FIG. 1.

The contrast is then equal to the ratio of the measurement of the level of the main peak to the measurement of the level of the part of the pedestal. Before determining this ratio, the levels of the main peak and the part of pedestal are corrected by the attenuations that were applied to them in the processing device.

In the example shown in FIG. 1, the optical separation device 2 comprises an optical division device 10 with an input forming the input channel e that receives the laser pulse, and first and second outputs s1, s2 to output the first and second replicas R1, R2 of the laser pulse respectively. The first output s1 is connected to the first output channel S1 (through an optical fibre). We will describe the characteristics of this device 10 in more detail later.

The optical separation device 2 also comprises an optical amplitude modulation device 12. This device has an input em connected to the second output s2 (through an optical fibre), and an output sm connected to the second output channel S2. This modulation device 12 is designed to eliminate the main peak of the second replica and to only allow the part of the pedestal to pass through, when a control signal provided for this purpose is applied to it.

FIG. 1 shows the signal SP corresponding to the part of the pedestal that the modulation device allows to pass; and the dashed lines E symbolise the eliminated peak.

In the example shown in FIG. 1, the modulation device 12 is an electro-optical modulation device. An acousto-optical modulation device could also be used, but its performances are not as good; it is not as fast as an electro-optical modulation device in eliminating a light pulse.

In the example shown in FIG. 1, the processing device also comprises a trigger device 14 to trigger the modulator 12 by the main peak II of the laser pulse (more precisely, by the first replica R1 of the laser pulse in the case in FIG. 1).

This trigger device 14 comprises an optical coupler 16 to sample a part of the first replica R1, and an opto-electrical conversion device 18 that receives the part thus sampled and outputs an electrical signal representative of this part. As can be seen, the amplitude modulation device 12 is controlled by this electrical signal.

We will now describe the trigger device 14 in more detail.

A control signal has to be sent to the modulation device 12 so that it clips the laser pulse that reaches it, in other words so that it eliminates the main peak when it receives the control signal.

The modulation device 12 can be triggered by an external synchronisation signal that is synchronous with the laser (not shown) that emits the pulse or pulses for which the contrast is to be measured.

But it is preferable to trigger it internally using a synchronisation device so that there is no need to manage delays to be applied to the trigger signal. This is what is done in the case of the device shown in FIG. 1 that comprises the coupler 16 and the opto-electrical conversion device 18 to control the modulation device 12.

An asymmetric coupler 16 can be used, for example of the 90/10 type that sends 10% of the optical energy that reaches it to the conversion device 18. Considering the high intensity of the peak II, a 50/50 type symmetric coupler can also be used; but in this case the attenuation device 6 is chosen to apply less attenuation to the pulse that reaches it.

Furthermore, use of the coupler 16 and the conversion device 18 causes a delay in the control of the modulation device 12. It may then be necessary to insert an optical delay fibre in the optical line that leads to the modulation device to prevent the clip command from arriving to it too late.

In the example shown, the temporal shift device 4 comprises an optical fibre 20, and the multiplexing device 8 and the optical division device 10 comprise optical couplers 22 and 24 respectively. The attenuation device 6 is also tuneable.

It is important to note that the order of the devices 4 and 6 can be inverted; the attenuation device 6 could precede the temporal shift device 4 instead of following it.

We will now reconsider the characteristics of devices 8 and 10 comprising the couplers 22 and 24 in the example described.

Considering that the optical intensity of the main peak II is very much higher than that of the pedestal I, an attempt is made to have the highest possible optical intensity on the channel corresponding to the pedestal and at the output from this channel. This is why highly asymmetric couplers, for example 90/10 couplers, are chosen in preference.

For coupler 22, this means that 90% of the optical intensity that is output from it originates from the modulator and the remainder (10%) is output from the attenuator. And for coupler 24, this means that 90% of the optical intensity that reaches it is sent to the modulation device and the remainder (10%) is sent to the attenuator.

Symmetric 50/50 couplers could also be used, but in this case it would only be possible to measure contrasts of less than $10^5$.

The system for measuring the temporal contrast of the laser pulse shown in FIG. 1 comprises the laser pulse processing device that has just been disclosed, and a photodetection device 26 to detect the main peak and the part of the pedestal that were multiplexed and to output an electrical signal representative of the corresponding levels N1, N2 of the main peak and the part of the pedestal.

This system also comprises an electronic processing device 28 to process the electrical signal in order to determine the value of the contrast C. In the example shown, this processing device 28 comprises an oscilloscope 30. A digitiser could also be used instead of the oscilloscope.

Note that the attenuation device 6 is a fibre-optic attenuator. Its function is to attenuate the intensity of the peak, more precisely the intensity of the optical signal R1 so that the amplitude of this signal is of the same order of magnitude as the amplitude of the pedestal on arrival to the photodetection device 26.

A tuneable attenuator or a variable attenuator is used in the example. A fixed attenuator could be used, in other words an attenuator that is not tuneable, but the working range of the system would then be limited. This is possible if the order of magnitude of the temporal contrast to be measured is known.

For information, and without being in any way limitative, we would like to measure a contrast of $10^5$ with a pulse with a peak power equal to 500 mW, using the following numeric values:

coupling ratio of couplers 22 and 24: 90/10
optical insertion losses of the modulation device 12: 6 dB
sensitivity of the photodetection device 26: 600 mV/mW
variable attenuator 6: 34 dB The result is optical losses ILI equal to about 7 dB on the channel of the device corresponding to the pedestal I, and optical losses ILII equal to about 54 dB on the channel corresponding to pulse II.

Thus, the values that are measured using the oscilloscope 30 are:

VI=0.6 mV for the channel corresponding to the pedestal
VII=1.2 mV for the channel corresponding to the peak.

The contrast C is deduced from these values:

$$C = \frac{VII \times 10^{\left(\frac{ILII}{10}\right)}}{VI \times 10^{\left(\frac{ILI}{10}\right)}} = \frac{(1.2 \times 10^{-3}) \times 10^{5.4}}{(0.6 \times 10^{-3}) \times 10^{0.7}}$$

Therefore C is not very different from 50 dB.

The parameter that limits the system is the noise of the oscilloscope that is of the order of a hundred microvolts (200 μV peak to peak). The intensity of the signal corresponding to the pedestal must be higher than this value before a contrast measurement can be made.

The device that has been disclosed with reference to FIG. 1 may be adapted depending on the needs:

coupling ratios of couplers 22 and 24 (and also of coupler 16 when there is one) can be chosen,
the delay that may occur on one of the channels: the peak can be delayed relative to the pedestal (by putting the temporal shift device 4 on the channel corresponding to the peak—case in FIG. 1) or the pedestal can be delayed relative to the peak (by putting the temporal shift device 4 on the channel corresponding to the pedestal),
a variable attenuation on line can be provided to adapt to the contrast to be measured; a variable attenuator (tuneable attenuator) is then used, which is the case for the device in FIG. 1,
a composite modulation device can be used to improve the extinguishing ratio of this modulation device: the modulation device 12 is a simple modulation device, for example a Mach-Zehnder modulation device, but it could be replaced by a composite modulation device, for example a double modulation device that may include two Mach-Zehnder modulation devices so that a high peak can be better eliminated, an internal synchronisation of the measurement system can be provided by detection of the optical pulse (case in FIG. 1), the sensitivity of the photodetection device 26 can be chosen.

Various aspects of the system shown in FIG. 1 are described below.

The level of the pedestal can be measured provided that it is still present after the peak for a duration longer than the response time of the modulator.

The system shown in FIG. 1 is a completely fibred system. This means that the signal to be characterised must be transported by an optical fibre.

This system can be used to measure temporal contrasts of more than $10^5$ (50 dB). This depends on the level of the input signal: the higher the input signal, the greater the measurable contrast.

Use of the same rating on the oscilloscope gives better precision on the measurement: this eliminates the linearity between ratings.

This system uses active components and therefore has to be calibrated.

This system may be independent and may synchronise itself; as a variant it may be synchronised by the user.

This system may be made compact and therefore easily transported.

It can also be used to measure the contrast of a pulse with a non-negligible continuous background. This is diagrammatically illustrated in FIG. 2 that shows the system that was disclosed with reference to FIG. 1, to which a laser pulse is input for which the pedestal I* is not negligible relative to the peak II*.

Figure 2:
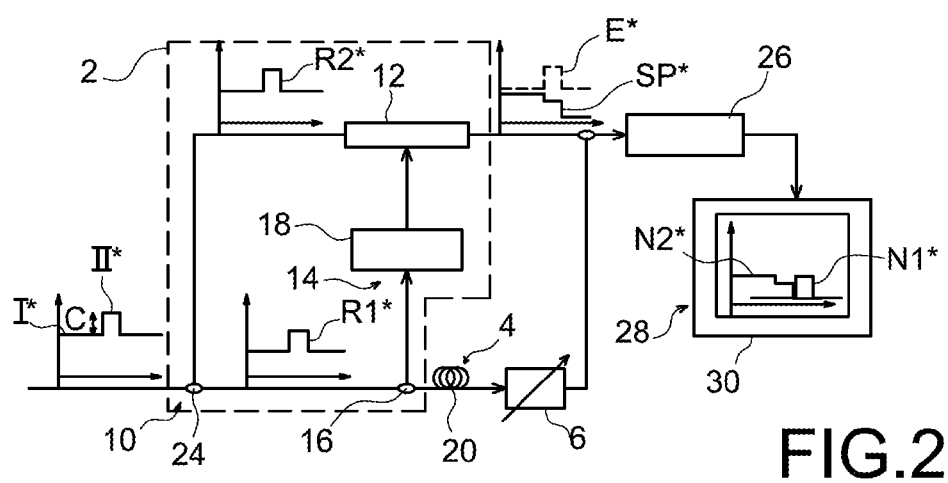

In FIG. 2, signals corresponding to the signals in FIG. 1 have the same references followed by the symbol "*".

Preferably, the duration of the electrical signal applied to the modulation device 12 is sufficient so that the modulator also clips the laser pulse zone for which the contrast C is to be measured, zone in which the optical signal output from the output channel S1 will recombine with the signal that passed through the modulation device 12, in other words the signal output from the output channel S2.

It may be required to not only clip the main peak of the pulse but also to eliminate other parts of this pulse.

Figure 3:
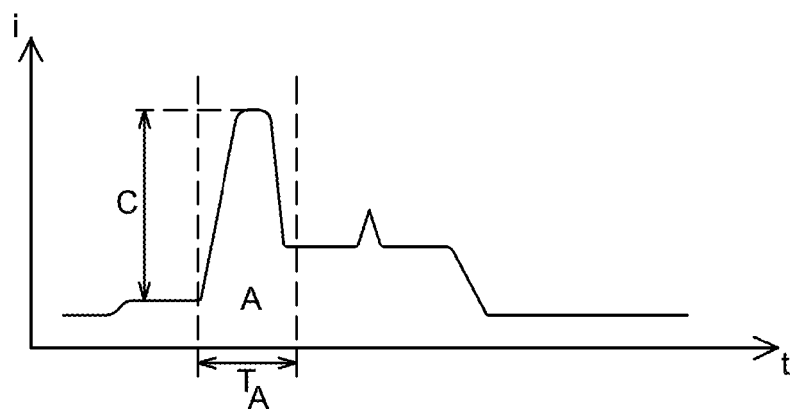

For example, consider the laser pulse with a shape like that shown diagrammatically in FIG. 3 and for which the temporal contrast C is to be measured. The time t is shown as the abscissa and the light intensity i as the ordinate.

Figure 4:
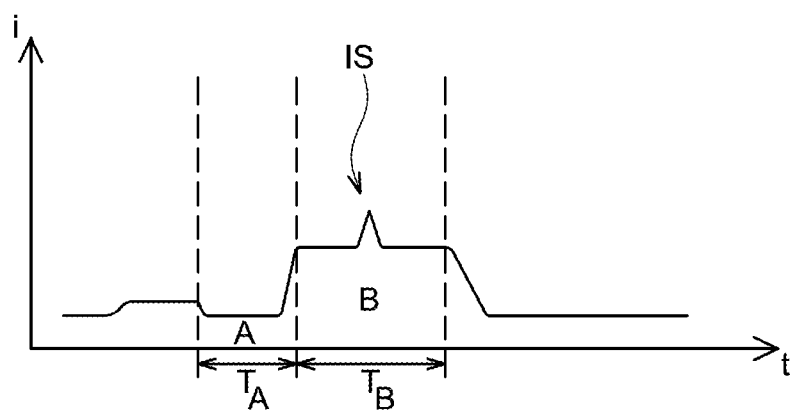

If only the main peak (zone A delimited by dashed lines) is clipped, the signal diagrammatically illustrated in FIG. 4 will be obtained at the output from the modulation device 12. The presence of a continuous background and/or another pulse IS can be seen on the studied pulse. This other pulse IS is in the zone B that is delimited by dashed lines and close to zone A.

Zone B corresponds to the location at which the peak is to be recombined, and the signal in this zone B is not negligible and can influence the measurement of the peak and therefore the measurement of the contrast C.

Consequently, it is preferable to either to apply a first electrical signal to the modulation device 12 to clip the entire main peak, and a second electrical signal to switch off the optical signal at the time at which the signal PA output from the attenuator 6 must recombine with the modulation device 12 (output channel S2), or apply an electrical signal with a duration $T_A+T_B$ that is equivalent to the duration $T_A$ of the main peak plus the duration of $T_B$ corresponding to zone B, to the modulation device 12.

This provides a means of clipping the main peak regardless of the type of laser pulse being studied.

The electrical control signal applied to the modulation device 12 is advantageously proportional to the shape of the laser pulse to be measured. Among other possibilities, this means that the technique that has just been disclosed with reference to FIGS. 3 and 4 can be applied.

Such an electrical signal is obtained as described below:

Firstly, note that the opto-electrical conversion device 18 conventionally comprises a photodiode associated with a first electronic circuit; the modulation device conventionally comprises an optical amplitude modulator that is itself associated with a second electronic circuit; and the first circuit outputs an electrical signal that triggers the second circuit.

The signal proportional to the shape of the laser pulse can then be obtained as follows:

replace the opto-electrical conversion device 18 with the structure mentioned above, by an opto-electrical conversion device comprising the photodiode associated with an electronic circuit composed of an programmable electrical shape generator, and replace the device 12 by a simple optical amplitude modulator that is controlled by the electrical signal output by the programmable electrical shape generator.

Figure 5:
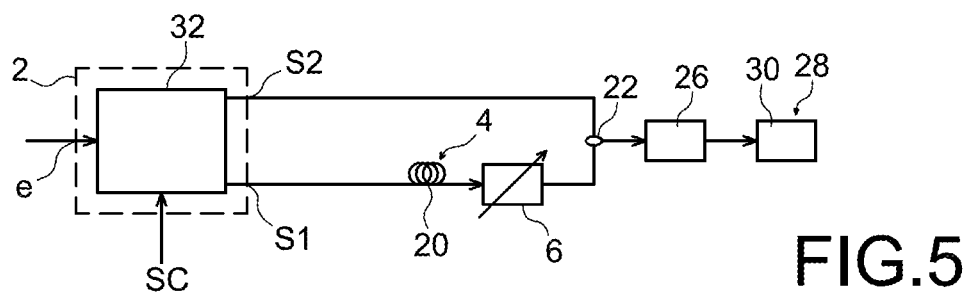
FIG. 5 is a diagrammatic view of a second particular embodiment of the device according to the invention.

FIG. 5 diagrammatically illustrates another particular embodiment of the laser pulse processing device.

In this other example, the optical separation device 2 comprises an optical amplitude modulator 32 with one input that forms the input channel e to receive the optical pulse, and first and second outputs that are complementary to each other and form the first and second output channels S1 and S2 respectively, to output the main peak and the part of the pedestal respectively when a control signal SC provided for this purpose is applied to the modulator 32.

As can be seen in this other example, the remainder of the measurement system remains unchanged: it includes the optical fibre 20, the attenuator 6, the coupler 22, the photodetection device 26 and the oscilloscope 30.

Refer in particular to the following document for information about optical amplitude modulators with two outputs complementary to each other:

[3] U.S. Pat. No. 6,320,692, Biasing System for an optical modulator with double output.

What is claimed is:

1. Device for processing an optical pulse to measure the temporal contrast of this pulse, the optical pulse comprising a pedestal and a main peak on the pedestal, the device comprising:

an optical division device, comprising an input channel that receives the optical pulse, and first and second output channels to provide the main peak and at least part of the pedestal respectively, the part that is used to measure the temporal contrast, a temporal shift device to create a temporal shift between the main peak and the part of the pedestal, an attenuation device to attenuate the main peak such that the corresponding levels of the main peak and the part of the pedestal are of the same order of magnitude, and an optical multiplexing device to multiplex the main peak thus attenuated and the part of the pedestal temporally shifted relative to the main peak, the contrast then being equal to the ratio of the measurement of the level of the main peak to the measurement of the level of the part of the pedestal, the levels of the main peak and the part of the pedestal being corrected by the attenuations applied to them in the processing device.

2. Device according to claim 1, in which the optical separation comprises:
   an optical division device with one input forming the input channel that receives the optical pulse, and first and second outputs to provide the first and second replicas respectively of the optical pulse, the first output being connected to the first output channel, and
   an optical amplitude modulation device with an input connected to the second output, and an output connected to the second output channel, designed to eliminate the main peak from the second replica and to allow only the part of the pedestal to pass when a control signal provided for this purpose is applied to it.

3. Device according to claim 2, further comprising a trigger device to trigger the modulation device by the main peak of the optical pulse.

4. Device according to claim 3, in which the trigger device comprises:
   an optical coupler to sample a part of the first replica, and
   an opto-electrical conversion device that receives the part thus sampled and outputs an electrical signal representative of it,
   and in which the modulation device is controlled by the electrical signal.

5. Device according to claim 2, in which the duration of the control signal applied to the optical amplitude modulation device is sufficient so that the optical amplitude modulation device also eliminates the part of the optical pulse in which the first replica of the optical pulse will be recombined with the output signal from the optical amplitude modulation device.

6. Device according to claim 2, in which the control signal of the optical amplitude modulation device is proportional to the optical pulse.

7. Device according to claim 1, in which the optical separation device comprises an optical amplitude modulator, with an input that forms the input channel to receive the optical pulse, and first and second outputs that are complementary to each other and form the first and second output channels respectively to provide the main peak and the part of the pedestal respectively when a control signal provided for this purpose is applied to the modulator.

8. Device according to claim 1, in which the temporal shift device comprises an optical fibre.

9. Device according to claim 1, in which the multiplexing device comprises an optical coupler.

10. Device according to claim 1, in which the attenuation device is tuneable.

11. System for measuring the temporal contrast of an optical pulse comprising:
    the optical pulse processing device according to claim 1,
    a photodetection device to detect the main peak and the part of the pedestal that were multiplexed and to output an electrical signal that is representative of the corresponding levels of the main peak and the part of the pedestal, and
    an electronic processing device to process the electrical signal in order to determine the value of the contrast.

12. System according to claim 11, in which the electronic processing device comprises an oscilloscope or a digitiser.

* * * * *